US012145797B1

(12) United States Patent
Bonerb

(10) Patent No.: US 12,145,797 B1
(45) Date of Patent: Nov. 19, 2024

(54) BULK LIFT AND DUMP SYSTEM

(71) Applicant: Timothy Charles Bonerb, N. Hampton, NH (US)

(72) Inventor: Timothy Charles Bonerb, N. Hampton, NH (US)

( * ) Notice: Subject to any disclaimer, the term of this patent is extended or adjusted under 35 U.S.C. 154(b) by 0 days.

(21) Appl. No.: 18/522,314

(22) Filed: Nov. 29, 2023

(51) Int. Cl.
*B65F 3/08* (2006.01)
*B65F 3/02* (2006.01)
*B65F 3/10* (2006.01)

(52) U.S. Cl.
CPC .............. *B65F 3/08* (2013.01); *B65F 3/0213* (2013.01); *B65F 3/10* (2013.01); *B65F 2003/0269* (2013.01); *B65F 2240/138* (2013.01)

(58) Field of Classification Search
CPC .. B65F 3/0213; B65F 3/08; B65F 3/10; B65F 2003/0269; B65F 2240/138
USPC .................................. 187/234, 253; 414/409
See application file for complete search history.

(56) References Cited

U.S. PATENT DOCUMENTS

| | | | | | | |
|---|---|---|---|---|---|---|
| 983,426 | A | * | 2/1911 | Carlson | F15B 21/14 | 187/253 |
| 2,020,245 | A | * | 11/1935 | Howard | B65F 3/08 | 414/913 |
| 2,028,405 | A | * | 1/1936 | McLauthlin | B66B 9/04 | 187/253 |
| 2,592,324 | A | * | 4/1952 | Oliver | B65F 3/08 | 414/409 |
| 2,808,947 | A | * | 10/1957 | Shippy | B60P 1/48 | 414/409 |
| 2,904,199 | A | * | 9/1959 | Linde | B65F 3/08 | 414/409 |
| 3,087,637 | A | * | 4/1963 | Fox | B65F 3/08 | 414/420 |
| 3,430,734 | A | * | 3/1969 | Embree | B66F 9/04 | 187/253 |
| 5,007,786 | A | * | 4/1991 | Bingman | B65F 3/08 | 414/409 |
| 5,035,563 | A | * | 7/1991 | Mezey | B65F 3/04 | 414/512 |
| 5,230,393 | A | * | 7/1993 | Mezey | B65F 3/08 | 177/139 |
| 5,582,500 | A | * | 12/1996 | Morris | B65F 3/08 | 414/422 |
| 10,301,111 | B2 | * | 5/2019 | Schell | B65F 3/08 | |
| 11,492,196 | B2 | * | 11/2022 | Pung | B65F 3/06 | |
| 2006/0127202 | A1 | * | 6/2006 | Tryggvason | B65F 3/08 | 414/407 |
| 2019/0210798 | A1 | * | 7/2019 | Schultz | B65F 3/041 | |
| 2022/0180330 | A1 | * | 6/2022 | Dietrich | B65F 3/02 | |

FOREIGN PATENT DOCUMENTS

| | | | | | |
|---|---|---|---|---|---|
| CN | 108190327 | A | * | 6/2018 | B65F 3/08 |
| CN | 115285555 | A | * | 11/2022 | B65F 3/08 |
| EP | 0205353 | A2 | * | 12/1986 | B65F 3/08 |
| GB | 2168316 | A | * | 6/1986 | B65F 3/08 |
| JP | 05286504 | A | * | 11/1993 | |
| KR | 102195712 | B1 | * | 12/2020 | B65F 3/02 |
| KR | 102419431 | B1 | * | 7/2022 | B65F 3/10 |

* cited by examiner

*Primary Examiner* — James Keenan
(74) *Attorney, Agent, or Firm* — Tim Bonerb

(57) ABSTRACT

A detachable loading device mounted on a cargo container of a vehicle for handling, lifting and dumping bulk materials such as grass clippings, soil and other bulk materials.

16 Claims, 18 Drawing Sheets

BULK LIFT AND DUMP SYSTEM

BACKGROUND OF THE INVENTION

Field of Invention

The concept concerns the manual moving of bulk materials such as grass clippings, soil, stone, mulch etc. up and into a cargo vehicle with a generally open top such as a dump truck, dump trailer, dump insert, flat bed truck and/or flatbed trailer, shipboard container, storage bin, etc. . . . for temporary storage and/or transport.

Description of Related Art

After a lawnmowers' grass collection containers are full from mowing, the operator drives the mower to the cargo vehicle whereby the operator separates the grass clippings from the mower and then lifts each collection container over the top of a cargo container and dumps the grass clippings or other bulk materials onto the cargo container's floor. Typically, the operator loads the cargo container from both sides (driver's side and passenger side) as well as from the back tail gate area to create a level and balanced load.

DESCRIPTION OF DRAWINGS

Figure 1:
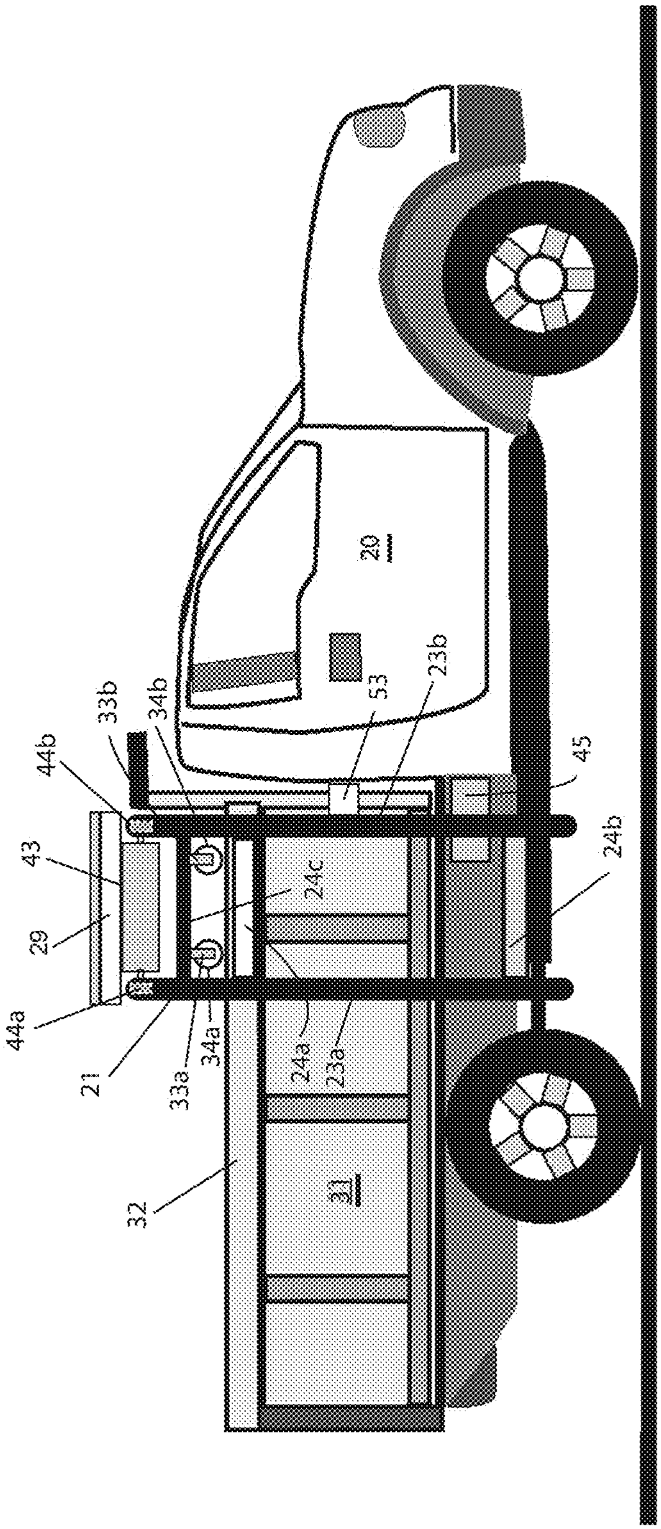
FIG. 1 is a side view of dump truck equipped with lift assembly mounted on shoulder side of truck with lift container collapsed and stowed for transport above dump container.
Figure 2:
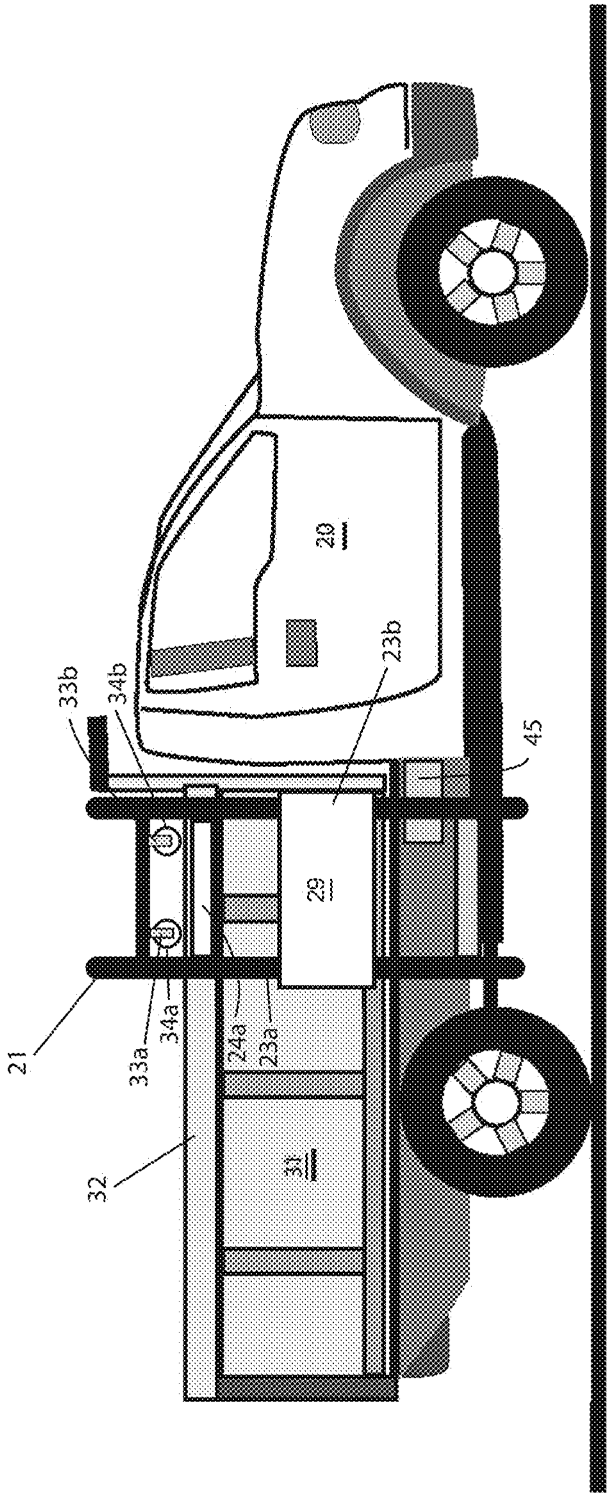
FIG. 2 is a side view of dump truck with lift container collapsed and positioned half way up lift rack of lift assembly.
Figure 3:
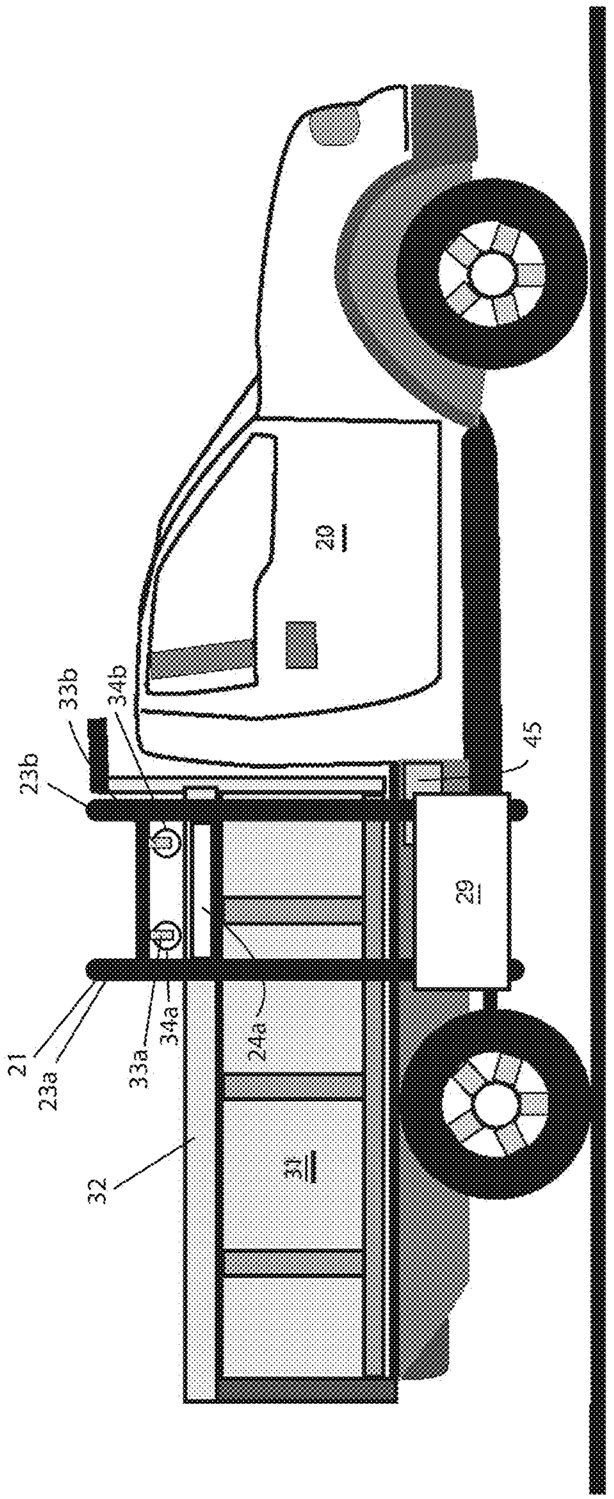
FIG. 3 is a side view of dump truck with lift container collapsed and positioned near the bottom of lift tracks of lift assembly.
Figure 4:
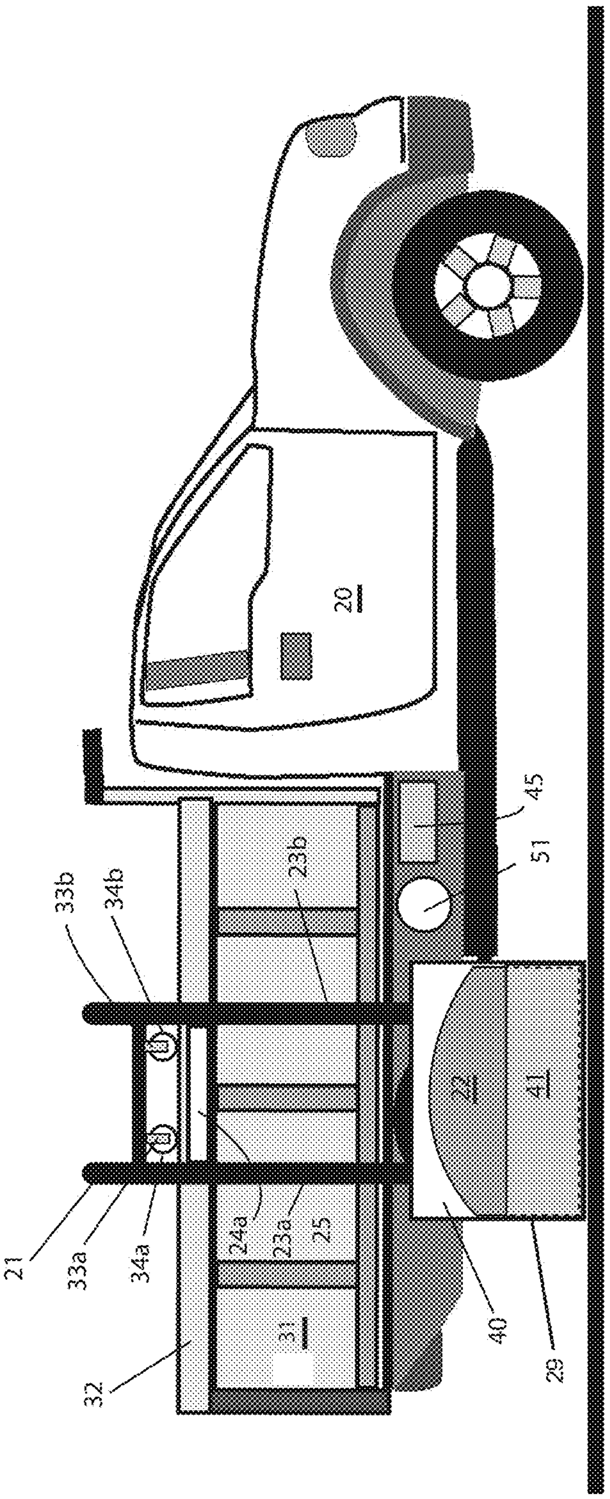
FIG. 4 is a side view of dump truck with lift container unfolded, filled with bulk material and positioned on lift assembly resting on the ground.
Figure 5:
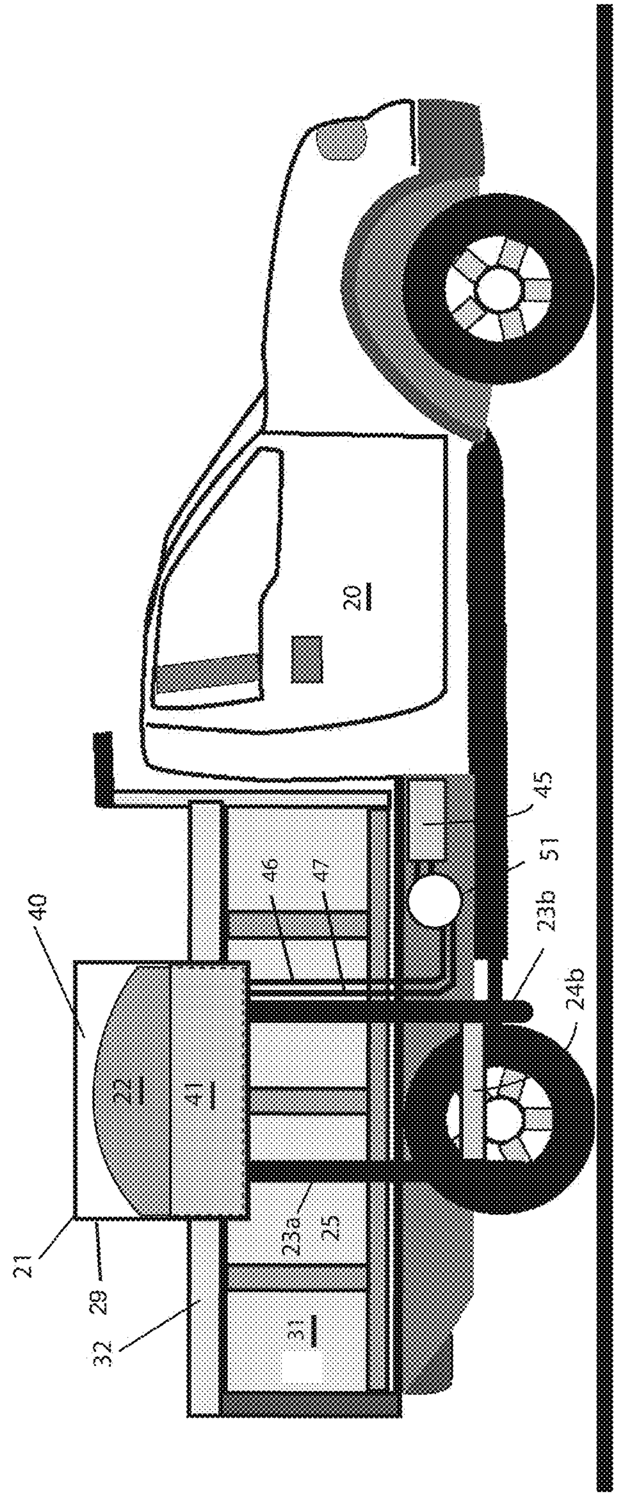
FIG. 5 is a side view of dump truck with lift container filled with bulk material and positioned near top rail of dump body secured to tracks of lift assembly.

FIGS. 1, 2, 3, 4 and 5 are side views of a dump truck 20 equipped with a lift assembly 21. In FIG. 1, the lift assembly 21 is equipped with a collapsed lift container 29 for transport at top of lift tracks 23*a* and 23*b* attached a top rail 32 of a dump body 31. Lift assembly 21 is secured to the dump body 31 via a lift assembly lock 53 when not in use. Also shown the lift container 29 secured to the lift tracks 23*a* and 23*b* via a roller beam 43 and rollers 44*a* and 44*b*. To provide movement of the lift assembly 21 along the top rail 32 of the dump body 31, wheel brackets 33*a* and 33*b* are equipped with wheels 34*a* and 34*b* are secured to a cross support 24*c* of the lift frame assembly 21. Lift tracks 23*a* and 23*b* are about 2 inches wide which remain inside of a cab mirror 57 (shown in FIG. 10) that is suitable and legal for operation on most roads in the world. In FIG. 2, the lift container 29 of the lift assembly 21 mounted on the dump body 31 of the dump truck 20 is lowered on the rails 23*a* and 23*b* in a collapsed configuration positioned about half way down the lift tracks 23 and 23*b*. Also shown is the lift assembly 21 with a lift assembly lock 53 removed to provide more filling locations along the side of the dump body 31. In FIG. 3, the lift container 29 remains in a collapsed configuration at bottom of the lift tracks 23*a* and 23*b* of the lift assembly 21. The lift container 29 may be provided in a rigid configuration (not shown) as well as a collapsed configuration. In FIG. 4, the lift assembly 21 has been moved towards the center of the dump body 31 via the wheels 34*a* and 34*b* on the top rail 32 of the dump body 31. As shown, the lift container 29 is opened with a back wall 40 and a lift container front wall 41 providing about 2 to 3 feet of space filled with about 200 pounds of a load grass clippings 22. When a hydraulic pump 45 is used to power the lift container 29 up and down the lift tracks 23*a* and 23*b*, it can be used in conjunction with a hydraulic hose reel 51 and hydraulic hoses 46 and 47 (shown in FIG. 5) to provide adequate movement of the lift assembly 21 along the top rail 32 of the dump body 31. The hydraulic hoses 46 and 47 (shown in FIG. 5) can be equipped with quick-disconnect fittings when the lift assembly 21 is not in use. Other power systems such as winches, linear actuators, air cylinders, rotary actuators, cable and pulley assemblies, etc. . . . can be used in place of the hydraulic pump 45. In FIG. 5, the lift container 29 filled with the grass clippings 22 has been elevated towards top end of the lift tracks 23*a* and 23*b* keep of the lift assembly 21.

Figure 6:
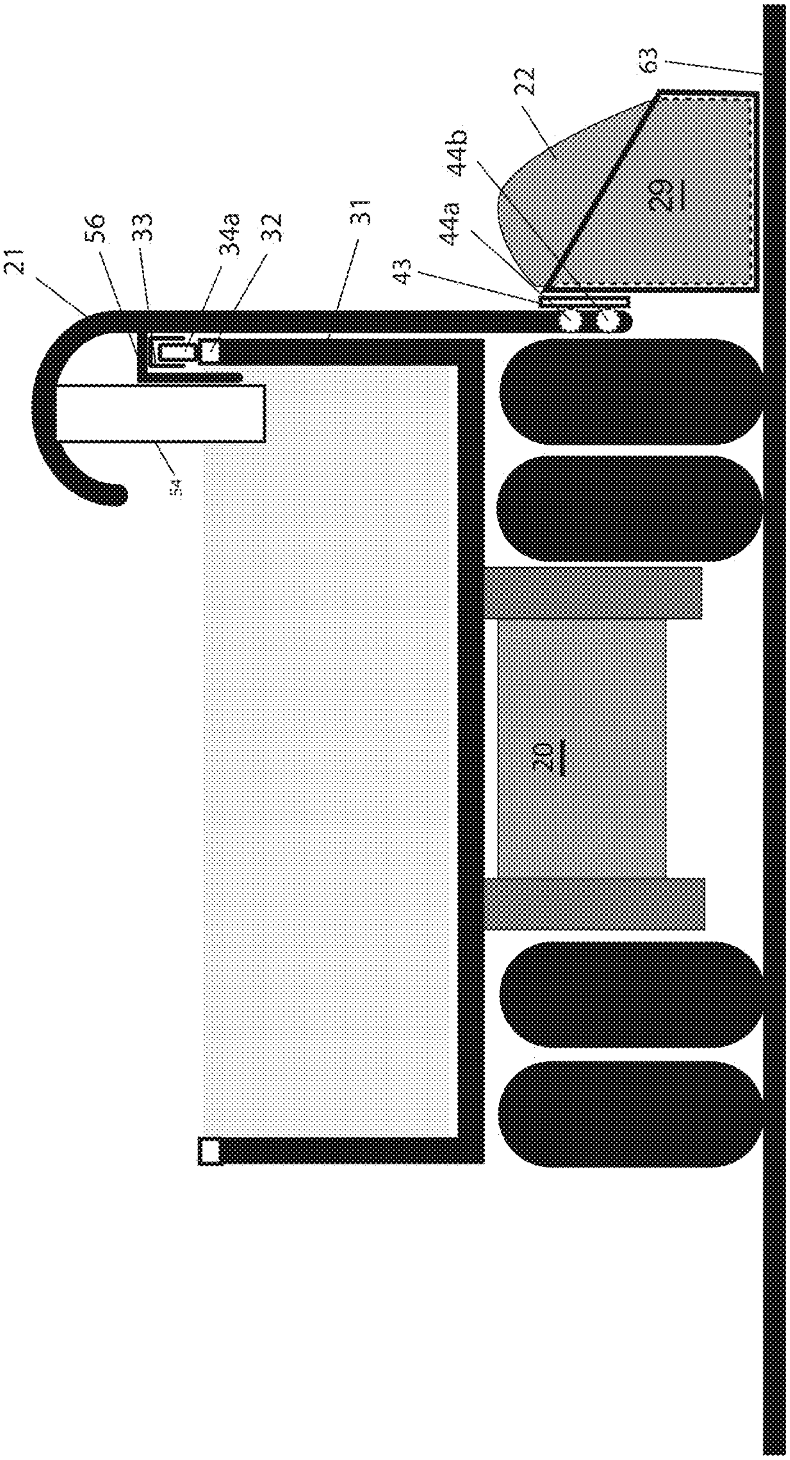
FIG. 6 is an end view of dump truck with lift container unfolded and filled with bulk material positioned and connected to bottom of tracks of lift assembly.
Figure 7:
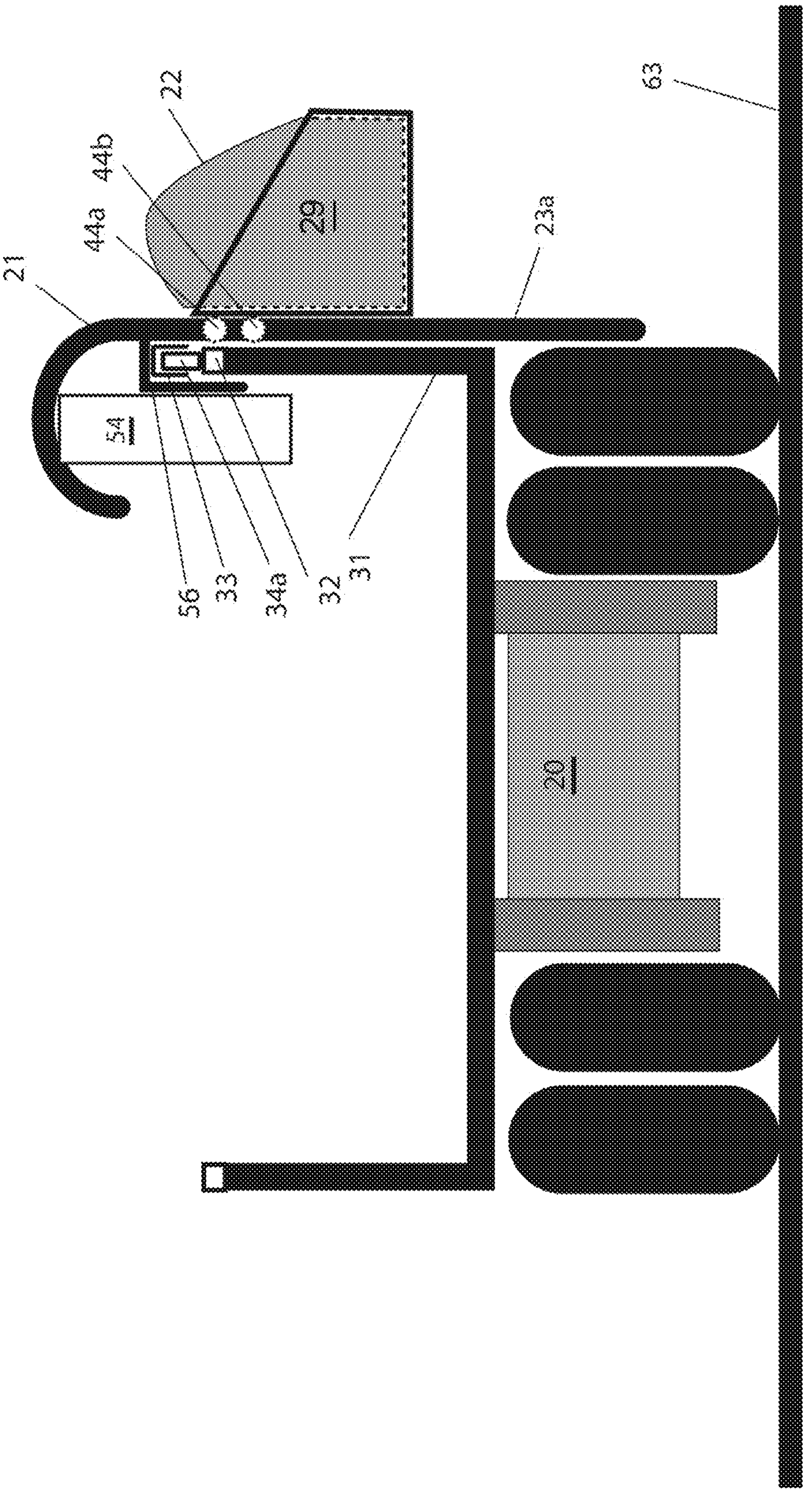
FIG. 7 is an end view of dump truck with lift container filled with bulk material and positioned half way up tracks and lift system.
Figure 8:
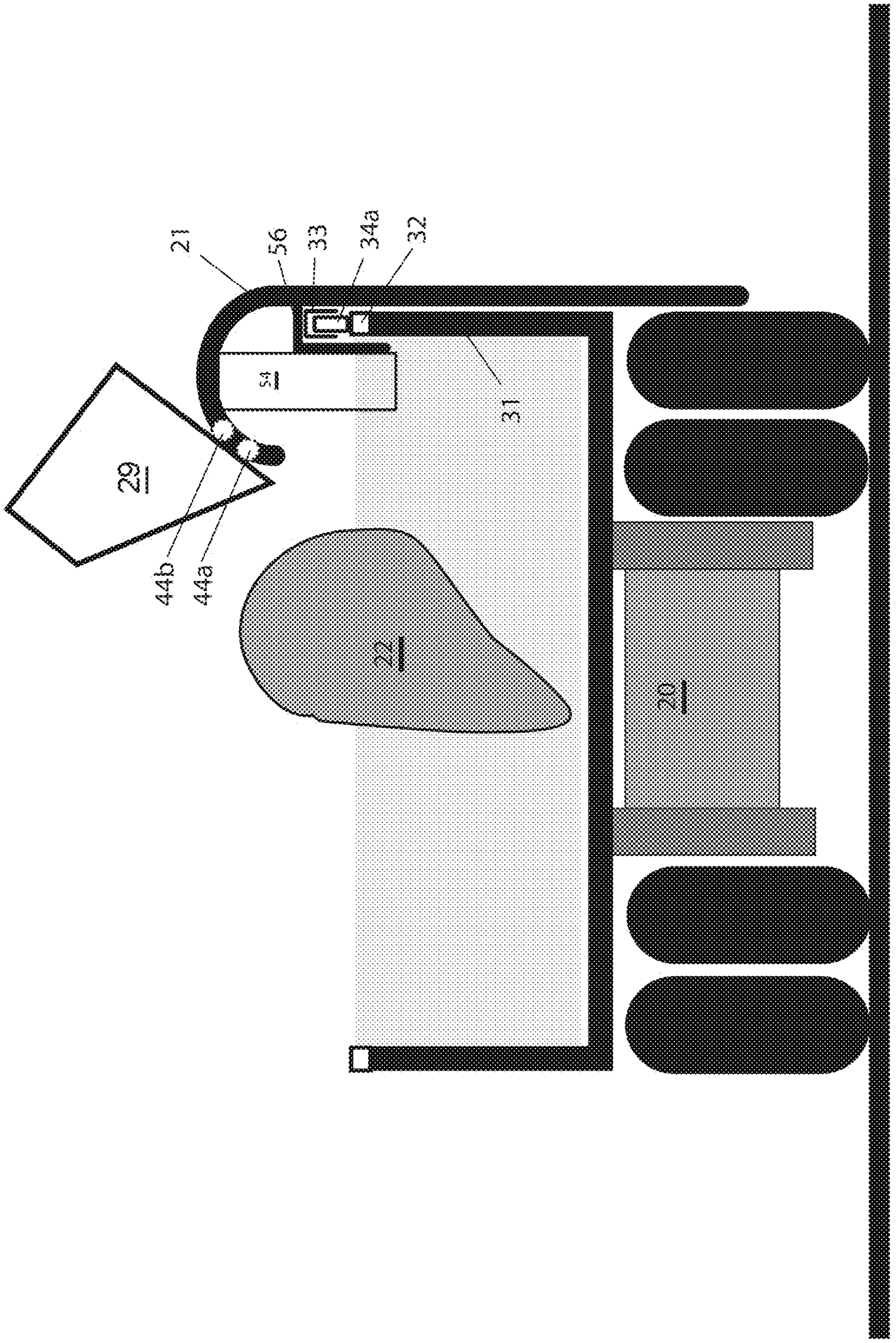
FIG. 8 is an end view of dump truck with empty lift container positioned at top of tracks while bulk material is loaded into dump body via lift system.
Figure 9:
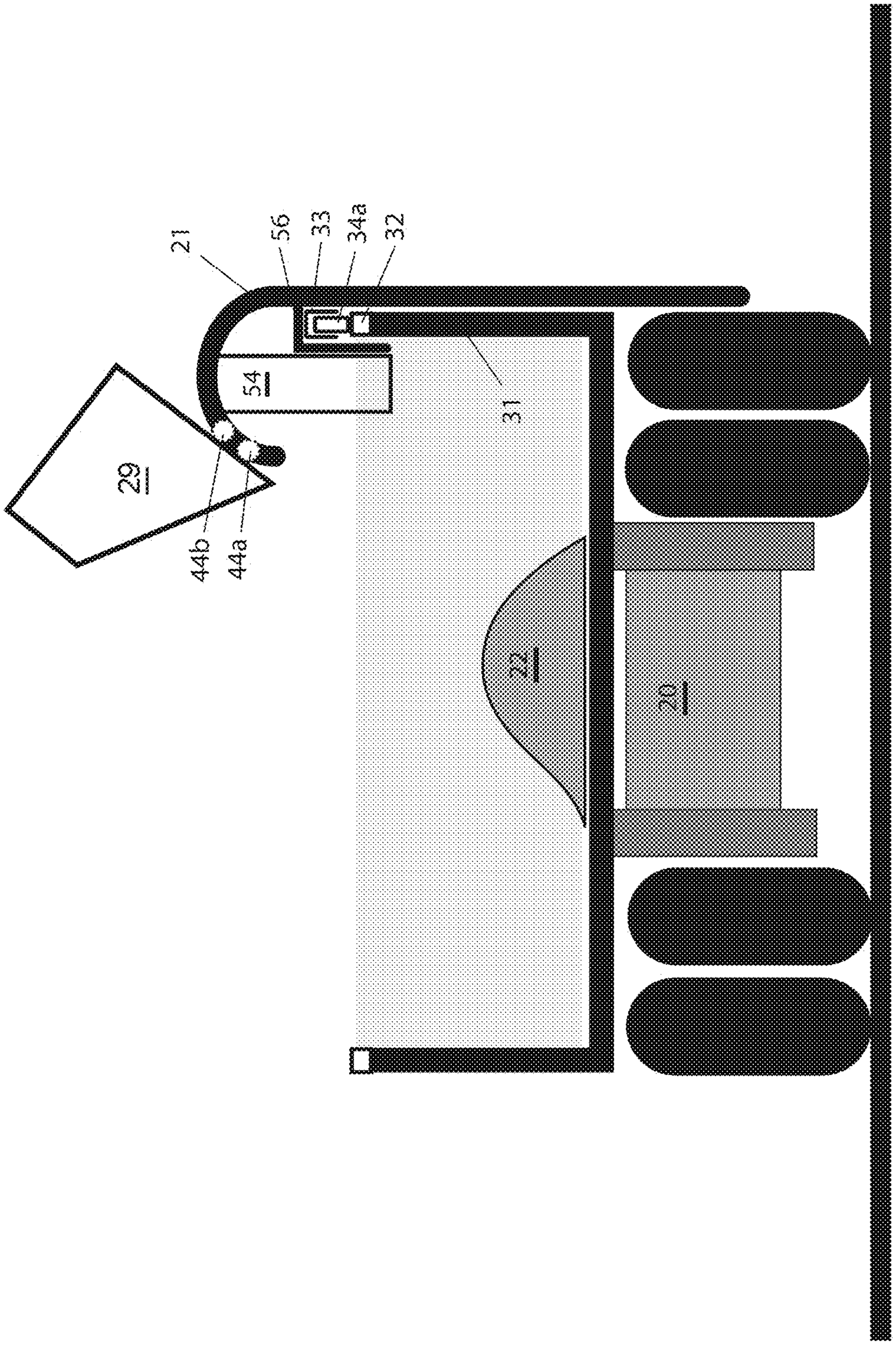
FIG. 9 is an end view of dump truck with empty lift container remaining at top of tracks while bulk material rests on floor of dump body.
Figure 10:
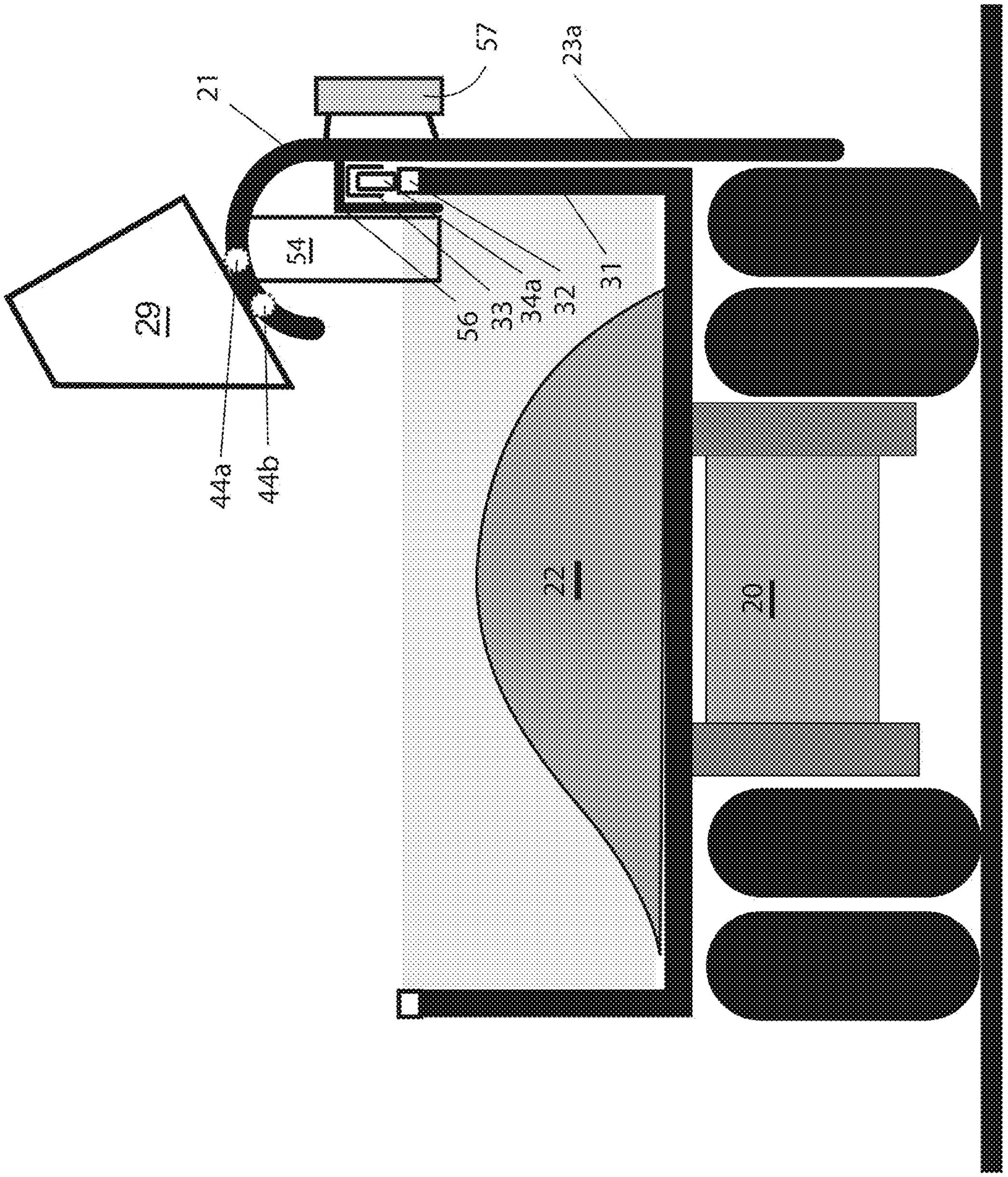
FIG. 10 is an end view of dump truck partially filled with bulk material while tracks of lift assembly remain inside the mirror on the cab of dump truck.

FIGS. 6, 7, 8, 9 and 10 are end views of the lift assembly 21 attached to the dump body 31 of the dump truck 20 with the lift container 21 at different height levels of operation during the loading process. In FIG. 6, the lift assembly 21, which can be quickly and easily detached from and/or re-attached to the dump body 31 by positioning a collar bracket 56 of the lift assembly 21 over the top rail 32 via lifting and lowering the lift system 21 via an overhead lifting equipment, is shown with the lift container 29 filled with the grass clippings 22 while resting on ground 63. Also shown is a control enclosure 54 secured to the lift assembly 21 and/or the collar bracket 56, which houses the hydraulic pump 45 (shown in FIGS. 1-5), a cable and pulley assembly 75 (shown in FIGS. 17-18) and other control and lift components. Other power systems and devices such as linear actuators, rotary actuators, air cylinders, load cells, scales, winches and other lifting and control devices may be used instead of hydraulics, grouped with the hydraulic pump 45. Attached to the collar bracket 56 is a wheel bracket 33*a* and a wheel 34*a* which allow the lift assembly 21 to be rolled along the top rail 32 of the dump body 31 as desired during the loading operation. In FIG. 7, the lift container 29. filled with the grass clippings 22 has been moved upward on the lift tracks 23*a* and 23*b* (shown in FIGS. 1-5) via a lift cable 7A and 7B (shown in FIGS. 17-19) on the lift assembly 21. In FIG. 8, the lift container 29 is empty and positioned at top end of the lift assembly track 21 with the load of grass clippings 22 discharged into the dump body 31 of the dump truck 20. In FIG. 9. the grass clippings 22 are piled on floor of the dump body 31 while the lift container 20 remains in a locked and stowed position before a truck 20 can move. In FIG. 10, the grass clippings 22 have been dumped onto the floor of the dump body 31. Also shown is the lift track 23*a*, which is about 2 inches wide, that remains against side of the dump body 31 and within the of outer width dimension of the mirror 57 on the truck 20 (shown in FIGS. 1-5) to meet the highway vehicle width limit of most countries around the world.

Figure 11:
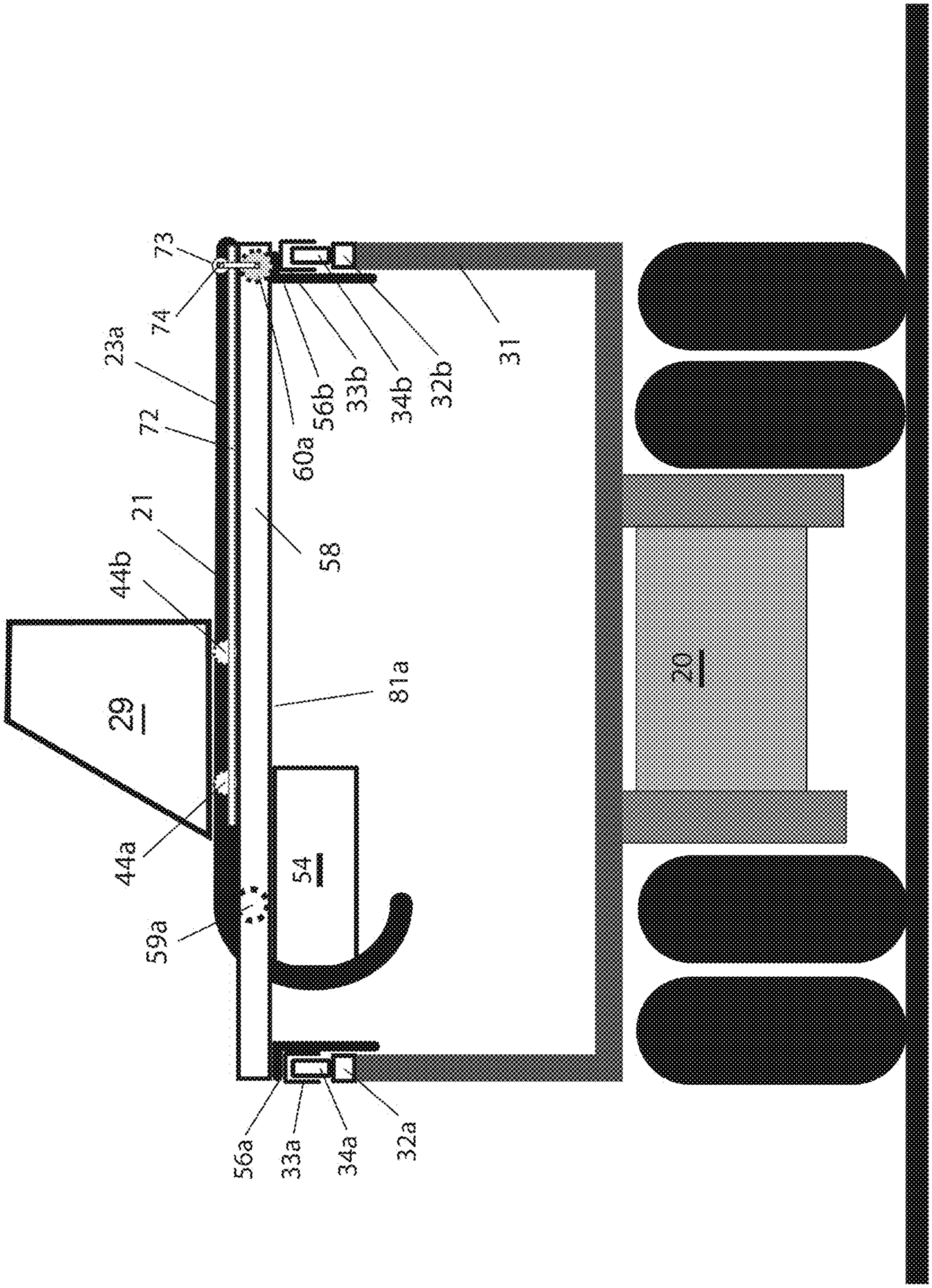
FIG. 11 is an end view of dump truck with lift assembly stowed on top of and within the width of the dump body.

FIGS. 11, 12, 13, 14 and 15 are end views of the lift assembly 21 mounted on the dump body 31 via a trolley frame 58 which is secured in a horizontal position to the top rails 32*a* and 32*b* whereby the lift assembly 21 and the trolley frame 58 do not extend beyond width of the dump body 31. In FIG. 11, the lift assembly 21 is in its' stowed position for transport secured to the trolley frame 58 via trolley wheels 59*a* and 59*b* (not shown but implicitly opposite of 59*a* in the figures) and fixed rollers 60*a* and 60*b* (not shown but implicitly opposite of 60*a* in the figures). Trolley frame 58 is equipped with collar brackets 56*a* and 56*b* which keep trolley frame 58 and lift assembly 21 centered between top rails 32*a* and 32*b* of dump body 31. Also shown are wheel brackets 33*a* and 33*b*, each equipped with wheels 34*a* and 34*b* respectively that are fixed to trolley frame 58. The wheels 34*a* and 34*b* allow the trolley frame 58 and the lift assembly 21 to move from the front of the dump body 31 to the back end of the dump body 31. The wheels 34*a* and 34*b* may be powered with small 115V or 12V motors for automatic and/or powered movement as the dump body 31 is filled with the lift assembly 21 from one end to the other end to create a level fill. The control enclosure 54 is fixed to the lift assembly 21 via the lift tracks 23*a* and 23*b* (shown in FIG. 16). The lift container 29 is attached to the lift tracks 23*a* and 23*b* (not shown) and/or the cross supports 24*a*, 24*b* and 24*c* (shown in FIG. 16). The lift container 29, which may be rigid as shown or collapsible, is attached to the lift frame tracks 23*a* and 23*b* (not shown but implicitly opposite of 23*a* in the figures) via a set of rollers 44*a* and 44*b* and a roller beam 43. For some applications, the wheels 44*a*, 44*b* and 44*c* and 44*d* (not shown, but 44*c* and

Figure 12:
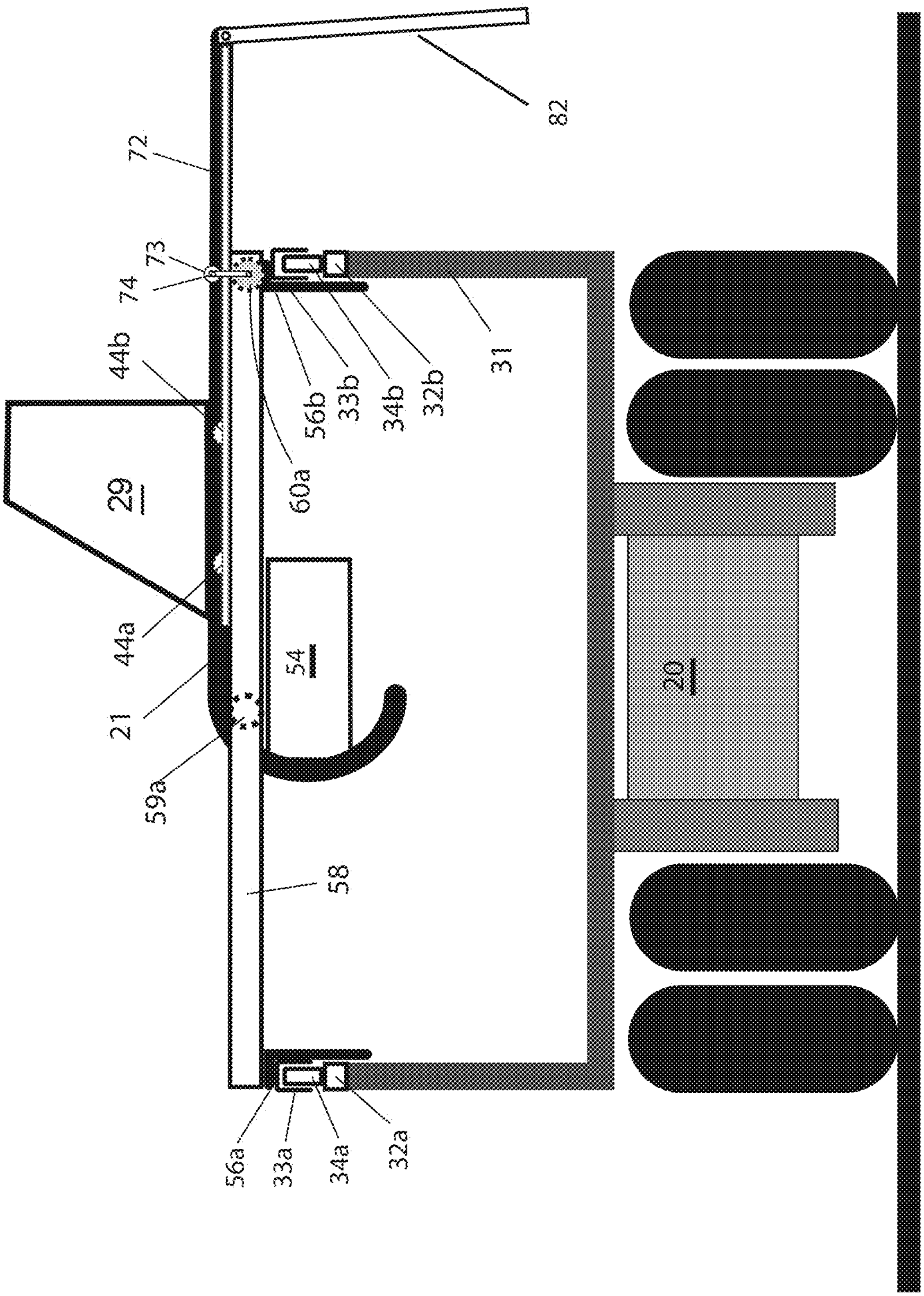
FIG. 12 is an end view of lift assembly moved towards shoulder side of dump truck while remaining connected to trolley frame of lift assembly.

44*d* are implicitly opposite of 44*a* and 44*b* in these figures) may be secured directly to the lift container 29. In FIG. 12, the operator has removed assembly the lift lock 53 (shown in FIG. 1) that holds the lift assembly 21 to the trolley frame 58 and has rolled the lift assembly 21 across the trolley frame 58 via a swivel pole handle 82. For the majority of applications, the lift assembly 21 may be moved back and forth on the trolley frame 58 via a linear actuator 80 (shown in FIGS. 17-19) and the cable and pulley assembly 75 (shown in FIGS. 17-19) contained in the control enclosure 54.

Figure 13:
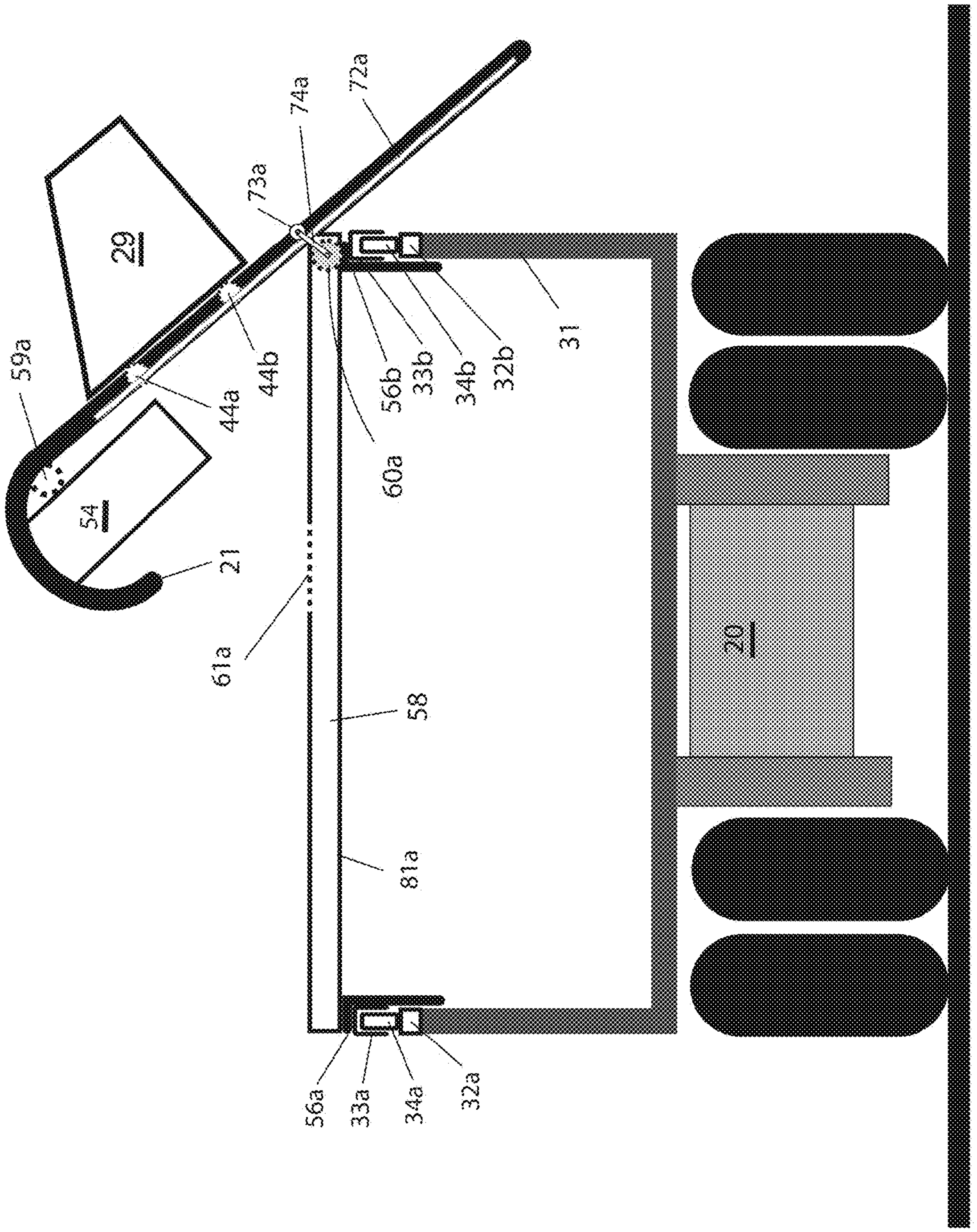
FIG. 13 is an en view of lift assembly angled downward while remaining connected to trolley frame mounted to rails of dump body prior to use.
Figure 14:
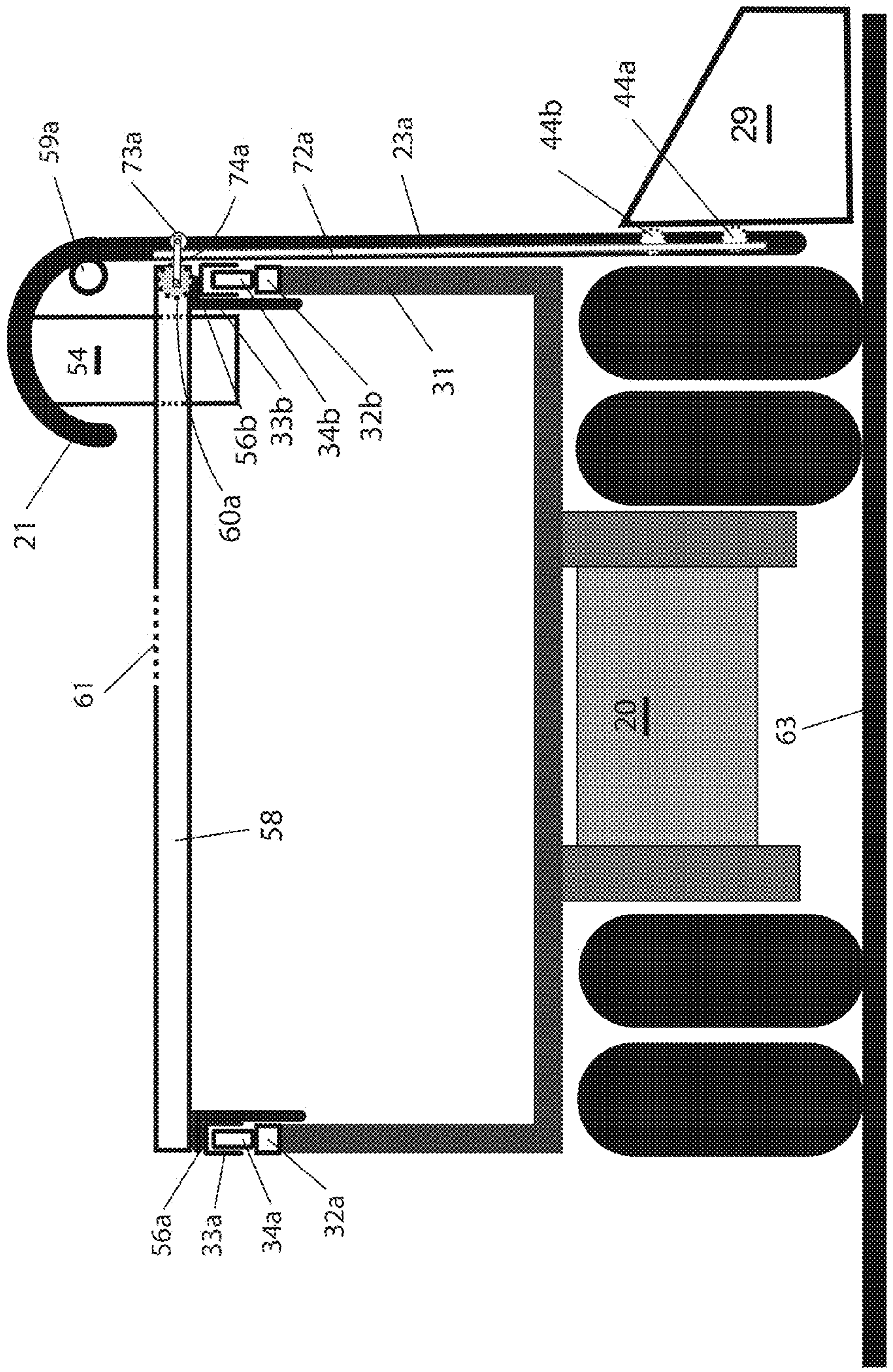
FIG. 14 is an end view of dump truck with lift container lowered to the ground via tracks of lift assembly positioned for loading.
Figure 15:
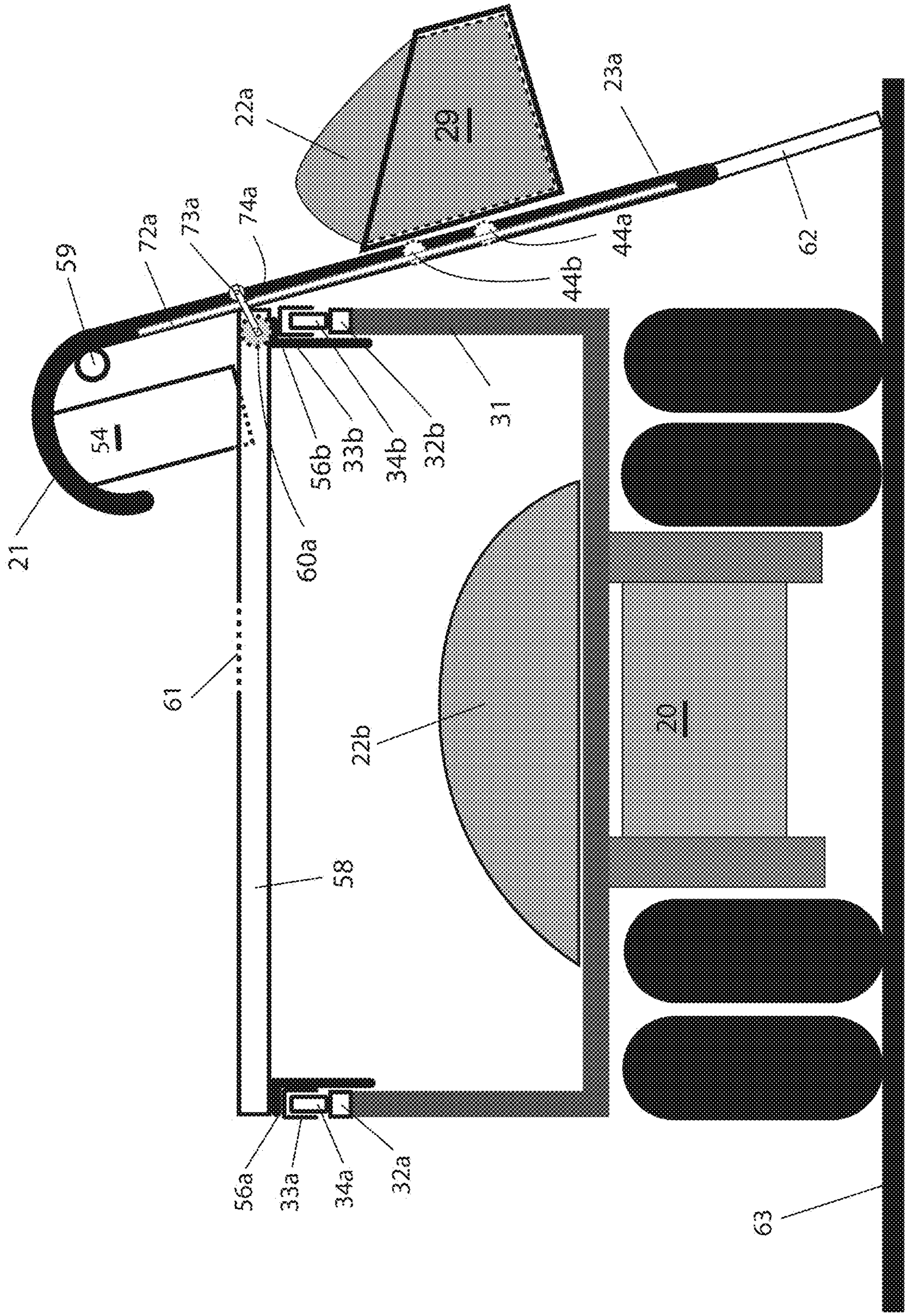
FIG. 15 is an end view of dump truck equipped with lift assembly having track extensions added to tracks.

In FIG. 13, as the lift frame 21 is pulled further along the trolley frame 58, a set of trolley wheels 59*a* and 59*b* are able to move upward via a set of trolley wheel openings 61*a* and 61*b*. The lift assembly 21 remains connected to the trolley frame 58 via fixed the rollers 60*a* and 60*b* (not shown but 60*b* is implicitly opposite of 60*a* in the figure) as a set of roller connectors 74*a* and 74*b* (not shown but 74*b* is implicitly opposite of 74*a* in the figure) in conjunction with the side rollers 73*a* and 73*b* (not shown but 73*b* is implicitly opposite of 73*a* in the figure) and as they remain engaged with the side rails 72*a* and 72*b* (not shown but 72*b* is implicitly opposite of 72*a* in the figure) fixed to the lift tracks 23*a* and 23*b* (shown in FIG. 16). In FIG. 14, the lift frame 21 has been lowered to the ground 63 on the passenger side of the truck 20 (shown in FIGS. 1-5). The lift tracks 23*a* and 23*b* remain connected to the trolley frame 58 and the dump body 31 via the side rails 72*a* and 72*b* which are contained between the fixed rollers 60*a* and 60*b*, the side rollers 73*a* and 73*b* and the roller connectors 74*a* and 74*b*. In FIG. 15, a set of track extensions 62*a* and 62*b*, (which may be adjustable in height) have been temporarily attached to the lift tracks 23*a* and 23*b* so that top end of the lift assembly 21 provides a higher and more centered position over the dump body 31 for the lift container 29 to provide a more balanced and centered load of the grass clippings 22*b* or other bulk materials within the dump container 31. As the lift container 29 is moved up the lift assembly 21 with another load of the grass clippings 22*a*, even with the lift tracks 23*a* and 23*b* angled and positioned higher on the dump body 31, the lift assembly 21 remains secured to the dump body 31 via a fixed roller 70 on the trolley frame 58 with the side rollers 73*a* and 73*b* and the roller connectors 74*a* and 74*b*.

Figure 16:
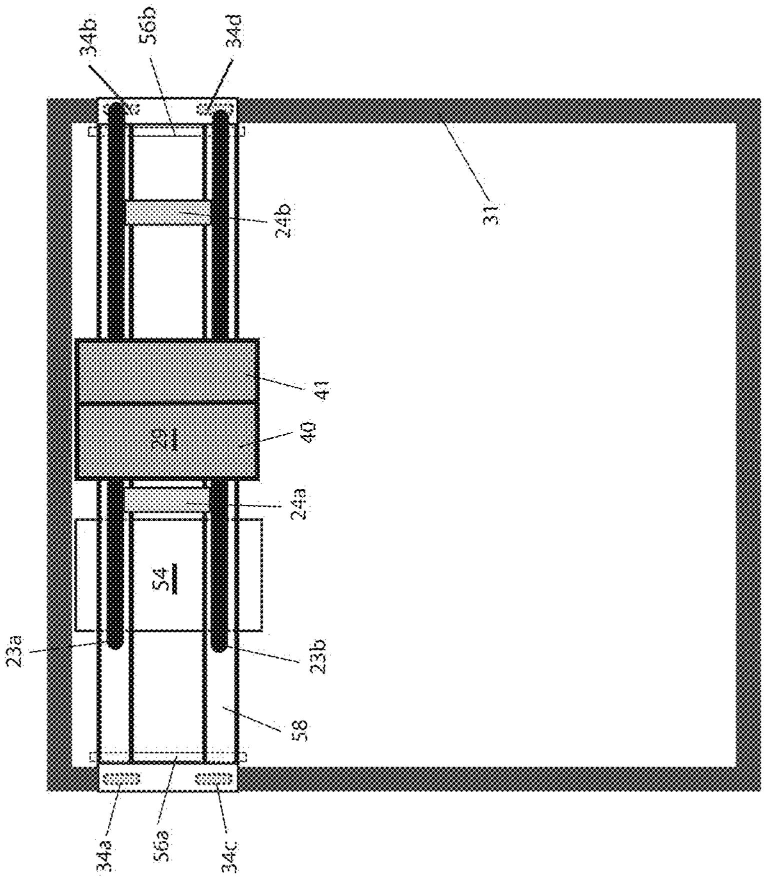
FIG. 16 is a top view of dump body on dump truck with lift frame assembly stowed on trolley frame.

FIG. 16 is a top view of the trolley frame 58 equipped with the lift assembly 21 stowed on the dump container 31. In FIG. 16, the trolley frame 58 and the lift assembly 21 are locked in position via the lift assembly lock 53 (shown in FIG. 1) while the truck 20 (shown in FIGS. 1-5) is parked and/or moving. The collar bracket 56*a* on the trolley frame 58 is equipped with the wheels 34*a* and 34*c* while the collar bracket 56*b* on the trolley frame 58 is equipped with the wheels 34*b* and 34*d* which are used for moving the trolley frame 58 along the top rails 32*a* and 32*b* of the dump body 31. The wheels 34*a*, 34*b*, 34*c* and 34*d* or connected to motorized chain (not shown) or the cable/pulley system 75 (shown in FIGS. 17-19). To comply with certain traffic and highway laws around the world which limit the width of a highway vehicles, the trolley frame 58 and the lift assembly 21 remain within the width of the dump body 31.

Figure 17:
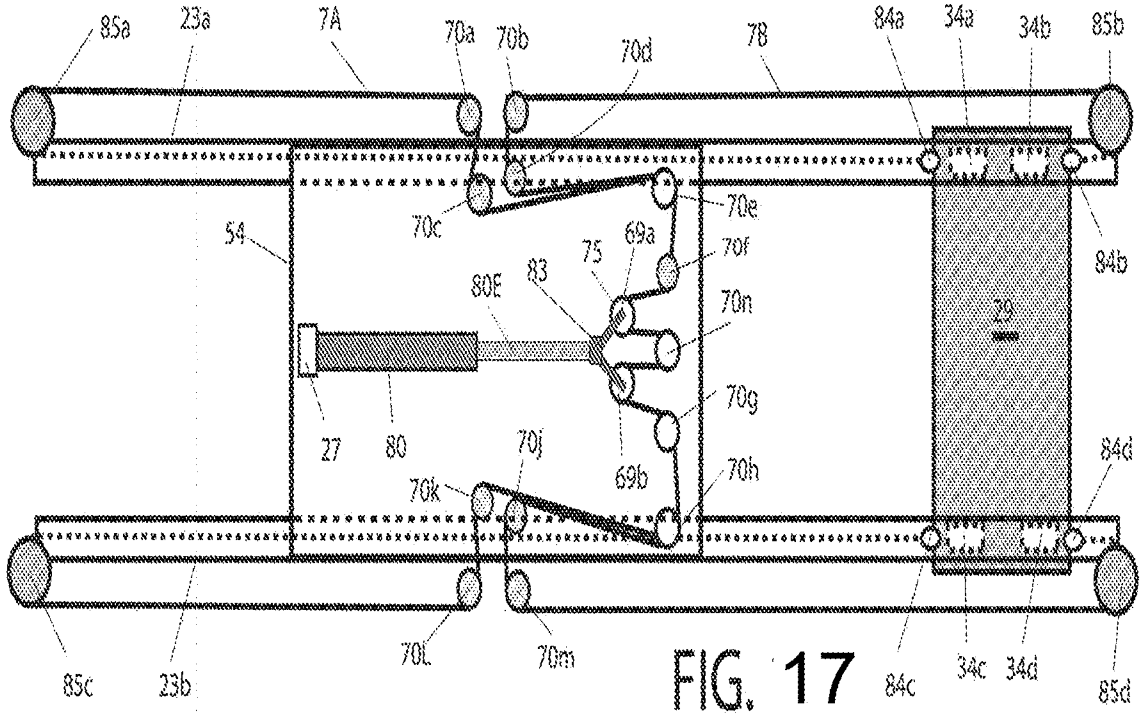
FIG. 17 is a top view of dump body of dump truck with lift assembly equipped with trolley frame moved towards one end of dump body via the trolley frames wheels running on top rail of dump body.
Figure 18:
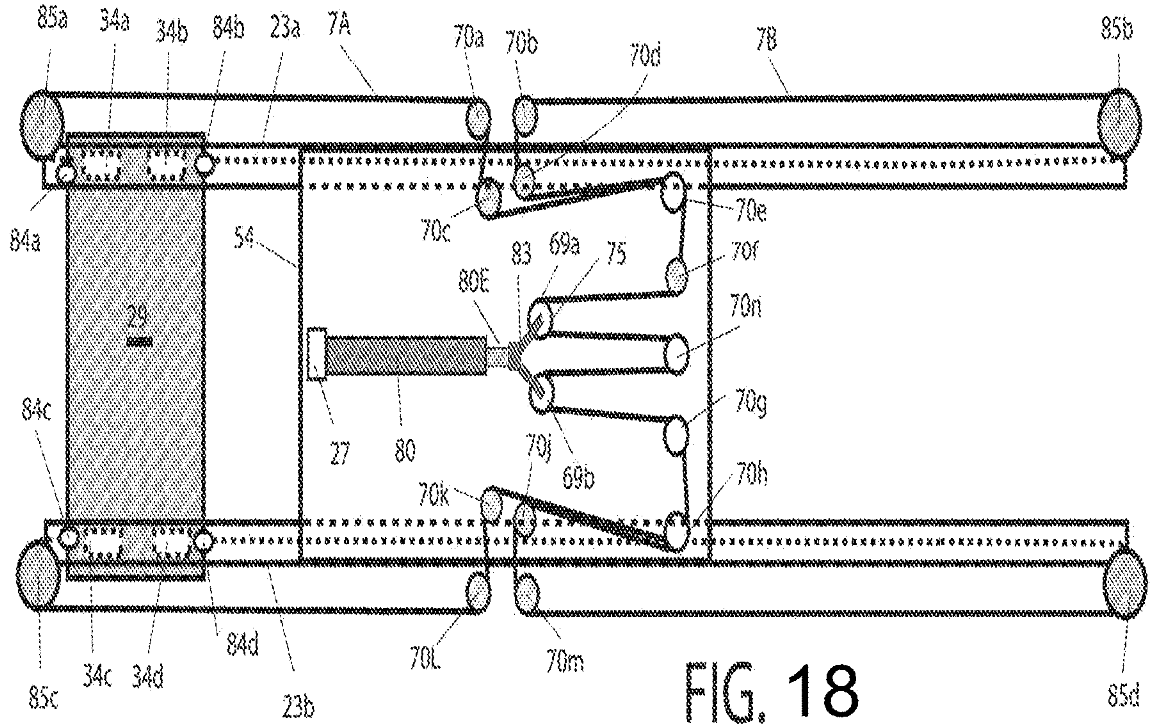
FIG. 18 is a top view of dump body of dump truck with lift assembly equipped with trolley frame moved towards the other-end of dump body via the trolley frames wheels running on top rail of dump body.

FIGS. 17 and 18 are top views of the lift assembly 21 with the control enclosure 54 with the linear actuator 80 installed to move a set of cables 7A and 7B secured to the lift container 29 up and down the lift tracks 23*a* and 23*b* via the cable and pulley assembly 75. In FIG. 17, the linear actuator 80 is equipped with a load cell 27 to act as a shut off switch in case the lift container 29 is overloaded and too heavy for the lift assembly 21 to be operated safely. As shown, to reduce the load and keep the travel distance relatively short a linear actuator extension 80E of the linear actuator 80, the cable and pulley system 75 are designed as a block and tackle type of arrangement. In this configuration, the lift container 29 will be moved up and down the lift tracks 23*a* and 23*b* via the cables 7A and 7B to provide an even and balanced lifting and lowering motion of the lift container 29 in case the lift container 29 has an uneven load and may tip to one side as if a single cable were used. The end of the cable 7A are equipped with a set of cable connectors 84*a* and 84*c* which will attach to top end of the lift container 29. The cable 7A is secured around a set of single pulley's 70*a* and 70*c* before it is secured to a set of double pulley's 70*e* and 70*f* for placement around a double moving pulley 69*a*, the double pulley 70*n* and then back around the double moving pulley 69*b* to the double pulley's 70*g* and 70*h* to a set of single pulley's 70*k* and 70L to the cable connector 84*c*. The cable 7B is first attached to the single pulleys 70*b* and 70*d* before being attached to the double pulleys 70*e* and 70*f* and then to the double movable pulley 69*a*, to the double pulley 70*n* and back to the movable double pulley 69*b* before it extends to out of the control enclosure 54 to the double pulleys 70*g* and 70*h* to the single pulleys 70*j* and 70*m* ending at the cable connector 84*d*. A mechanical advantage and reduced travel extension of the linear actuator 80 is established as evidenced by a 4 to 1 lifting ratio in both weight and distance. For example, as compared with a cable and pulley system with no type of block and tackle arrangement which equal a 1 to 1 ratio, for 1 inch of travel via the linear actuator extension 80E movement, 4 inches of cable travel is provided. Assuming the length of lift tracks 23*a* and 23*b* are 8 feet long, the liner actuator extension 80E will only need to move 2 feet instead of 8 feet. Also, the load in the lift container 29 is 4 times lighter resulting in the use of the less powerful linear actuator 80 actuator. In FIG. 18, the linear actuator extension 80E has been fully retracted enabling the lift container 29 to move up to the top lift tracks 23*a* and 23*b*. Note that cables 7A and 7B can be different parts of a single cable as shown in the figures.

Figure 19:
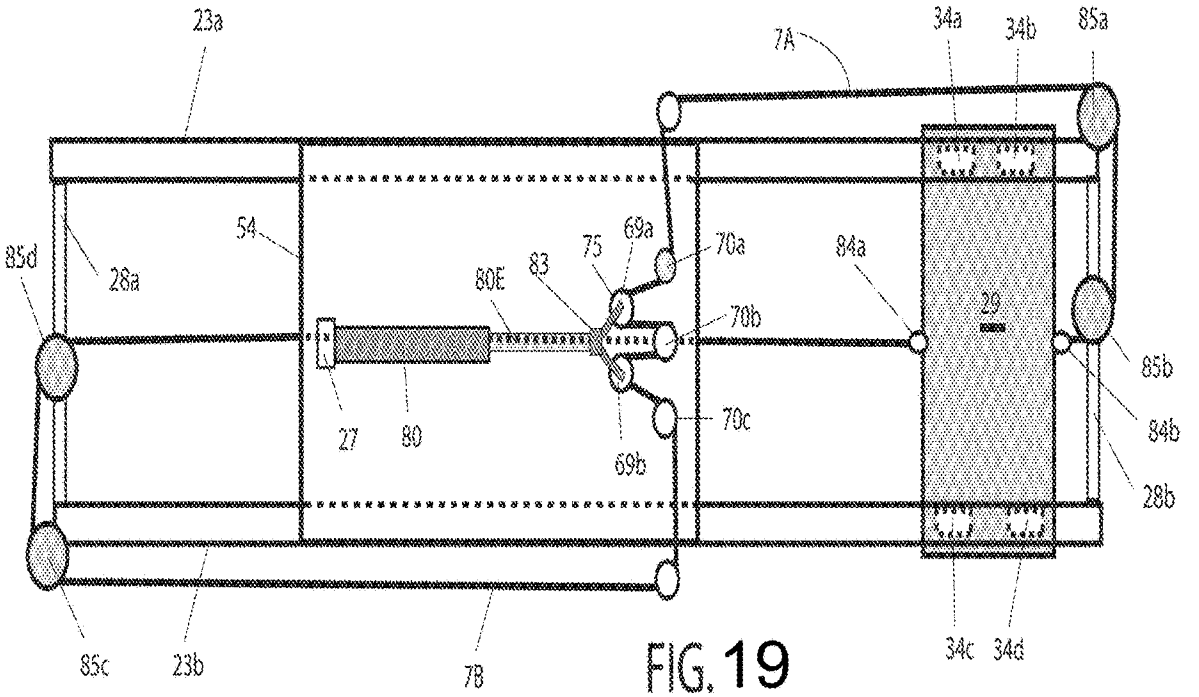
FIG. 19 is a top view of dump body of dump truck with lift assembly equipped with trolley frame with the cable configured in a different way.

FIG. 19 is a top view of the lift assembly 21 equipped with the control enclosure 54, the lift tracks 23*a* and 23*b*, the lift container 29 and cables 7A and 7B attached to the lift container in a different way. For some applications which may be designed to carry much heavier loads and/or a larger capacity, the lift container 29 may be made up to 6 feet wide and equipped with a lockable swivel mount to take up less space on the lift assembly 21 when stowed for transport.

I claim:

1. A detachable loading apparatus configured to be mounted on a cargo container (31) of a vehicle (20) for handling, lifting, and dumping bulk materials (22) comprising:
- a lift assembly (21) adjustably securable to a cargo container (31), the lift assembly comprising:
  - a pair of parallel lift tracks (23*a*, 23*b*), wherein the lift tracks (23*a*, 23*b*) are cane-shaped, comprising a straight portion at a lower end and a curved portion at an upper end, the curved portion curved toward an inside of the cargo container (31) to an extent that bulk materials (22) in the lift container (29) are tipped into the bulk container by gravity when the lift container is in an upper position on the lift tracks;
  - rollers (44*a*, 44*b*) configured to roll vertically up and down along the lift tracks; and

- trolley wheels (59*a*, 59*b*) attached to the lift tracks (23*a*, 23*b*) on a side opposite of the lift container (29);
- a control enclosure assembly (54) secured to the lift assembly (21), the control enclosure assembly comprising:
  - a linear actuator (80); and
  - a cable and pulley system (75) in operative communication with the linear actuator; and
- a lift container (29) attached to the rollers (44*a*, 44*b*) and the cable and pulley system (75); such that the lift container is configured for being loaded with bulk materials (22) at a lower position on the lift tracks (23*a*, 23*b*), raised to a higher position by operation of the control enclosure assembly (54), and tipped to dump the bulk materials into the cargo container (31); and
- a trolley frame (58) extending a width of the cargo container (31), the trolley frame comprising:
  - a respective collar bracket (56*a*, 56*b*) secured with a downward facing opening at each end of the trolley frame;
  - a respective set of wheel brackets (33*a*, 33*b*) secured within the opening of the collar brackets;
  - a set of wheels (34*a*, 34*b*, 34*c*, 34*d*) secured to the wheel brackets and configured to roll the trolley frame along a length of a top rail (32*a*, 32*b*) of the cargo container (31);
- a set of fixed rollers (60*a*, 60*b*) fixed to one end of the trolley frame (58) configured to roll the lift tracks (23*a*, 23*b*) over the trolley frame, whereby the lift assembly (21) is movable from a vertical position on a side of the vehicle (20) for handling the bulk materials (22) to a horizontal position over the cargo container (31) for transportation with the vehicle.

2. The apparatus of claim 1, further comprising:
- a pair of side rails (72*a*, 72*b*) affixed in a spaced relationship parallel to the respective pair of lift trucks (23*a*, 23*b*);
- a pair of side rollers (73*a*, 73*b*) secured in a rolling relationship between the side rails (72*a*, 72*b*) and the lift tracks (23*a*, 23*b*); and
- a pair of roller connectors (74*a*, 74*b*) connecting respective fixed rollers (60*a*, 60*b*) to respective side rollers (73*a*, 73*b*).

3. The apparatus of claim 1, the trolley frame (58) further comprising trolley wheel openings (61*a*, 61*b*) at a top side of the trolley frame configured to release the trolley wheels (59*a*, 59*b*) from being captured within the trolley frame and thereby permit the lift assembly (21) to rotate between the vertical position and the horizontal position.

4. The apparatus of claim 3, further comprising a swivel pole handle (82) attached to the lower end of at least one of the lift tracks (23*a*, 23*b*) for facilitating an operator rolling the lift assembly (21) across the trolley frame (58).

5. The apparatus of claim 3, further comprising a pair of track extensions (62*a*, 62*b*) adjustably secured to respective parallel lift tracks (23*a*, 23*b*) configured to adjust a dump position of the lift container (29) closer to a center of the cargo container (31) when the track extensions are extended.

6. The apparatus of claim 1, wherein the lift assembly (21) has an overall length less than a width of the cargo container (31).

7. The apparatus of claim 1, wherein the lift container (29) is a foldable lift container that is foldable flat against the lift tracks (23*a*, 23*b*), the foldable lift container comprising a back wall (40) and a front wall (41).

8. The apparatus of claim 1, further comprising:

a collar bracket (56) secured to the lift assembly (21) with a downward facing opening, downward facing wheel brackets (33) secured within the downward facing opening, and wheels (34*a*, 34*b*) secured along a wheel horizontal axis to the wheel brackets, the wheels configured to roll along a top rail (32) of the cargo container (31) and translate the lift assembly (21) along the top rail.

9. The apparatus of claim 1, further comprising a plurality of cross supports (24*a*, 24*b*) attached perpendicularly to the lift tracks (23*a*, 23*b*) for maintaining the lift tracks in a spaced and parallel relationship to each other.

10. The apparatus of claim 1, wherein the vehicle (20) is a dump truck and the cargo container (31) is a dump body of the dump truck.

11. The apparatus of claim 1, wherein the linear actuator (80) is a hydraulic cylinder, the apparatus further comprising a hydraulic pump (45), a hose reel (51), and hydraulic hoses (46, 47) in hydraulic communication with the hydraulic pump and hydraulic cylinder.

12. The apparatus of claim 1, the control enclosure assembly (54) further comprising a load cell (27) attached to the linear actuator (80).

13. The apparatus of claim 1, wherein the cable and pulley system (75) comprises a single cable (7) secured to the lift container (29) and the control enclosure assembly (54) and configured to raise and lower the lift container with the single cable by operation of the linear actuator (80).

14. The apparatus of claim 1, wherein the cable and pulley system (75) comprises a single cable (7) made up of two cable portions (7A, 7B) secured to the lift container (29) and the control enclosure assembly (54) and configured to raise and lower the lift container with the single cable by operation of the linear actuator (80).

15. The apparatus of claim 1, wherein the linear actuator (80) is at least one of a hydraulic cylinder, rotary actuator, air cylinder, or a winch.

16. The apparatus of claim 1, the cable and pulley system (75) configured to provide a 4 to 1 lifting ratio, defined by moving the lift container (29) four times a distance that the linear actuator (80) moves in operation.

* * * * *